United States Patent
Brown et al.

(10) Patent No.: US 10,123,241 B2
(45) Date of Patent: Nov. 6, 2018

(54) CELL RESELECTION

(71) Applicant: British Telecommunications Public Limited Company, London (GB)

(72) Inventors: Ruth Brown, London (GB); Maria Cuevas, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/540,981

(22) PCT Filed: Dec. 29, 2015

(86) PCT No.: PCT/EP2015/081380
§ 371 (c)(1),
(2) Date: Jun. 29, 2017

(87) PCT Pub. No.: WO2016/107887
PCT Pub. Date: Jul. 7, 2016

(65) Prior Publication Data
US 2017/0359759 A1 Dec. 14, 2017

(30) Foreign Application Priority Data
Dec. 30, 2014 (EP) .................................. 14250121

(51) Int. Cl.
*H04W 48/12* (2009.01)
*H04W 36/00* (2009.01)
(Continued)

(52) U.S. Cl.
CPC ....... *H04W 36/0055* (2013.01); *H04W 48/12* (2013.01); *H04W 48/16* (2013.01); *H04W 88/06* (2013.01)

(58) Field of Classification Search
CPC . H04W 36/0055; H04W 88/06; H04W 48/00; H04W 48/08
See application file for complete search history.

(56) References Cited

U.S. PATENT DOCUMENTS 9,713,059 B2  7/2017  Ramirez et al.
9,883,436 B2  1/2018  Brown et al.
(Continued)

FOREIGN PATENT DOCUMENTS

EP          2775760 A1     9/2014
WO    WO 2008/112255 A2   9/2008
WO    WO 2009/045968 A1   4/2009

OTHER PUBLICATIONS

International Search Report for corresponding International Application No. PCT/EP2015/081380 dated Apr. 15, 2016; 4 pages.
(Continued)

*Primary Examiner* — Chuong A Ngo
(74) *Attorney, Agent, or Firm* — Amy M. Salmela; Patterson Thuente Pedersen, P.A.

(57) ABSTRACT

An LTE cellular network having management mobility servers (MMEs), base stations (enodeBs) and mobile user equipment (UE). The network supporting two groups of mobile device subscribers; subscribers of a macrocell network and subscribers of a small cell network. The base stations being configured to broadcast network information and device configuration information to the mobile devices through System Information Block messages. The base stations being configured to selectively send override parameters to subscribers of the mobile devices to alter the idle mode reselection processing to prefer connections to the small cell network.

8 Claims, 12 Drawing Sheets

(51) Int. Cl.
*H04W 48/16* (2009.01)
*H04W 88/06* (2009.01)

(56) References Cited

U.S. PATENT DOCUMENTS

| | | | |
|---|---|---|---|
| 2008/0227453 A1* | 9/2008 | Somasundaram | H04W 48/20 455/436 |
| 2009/0086672 A1* | 4/2009 | Gholmieh | H04W 48/02 370/329 |
| 2013/0150039 A1 | 6/2013 | Ramle et al. | |
| 2014/0213256 A1 | 7/2014 | Meylan et al. | |
| 2017/0347298 A1 | 11/2017 | Brown et al. | |

OTHER PUBLICATIONS

Written Opinion of the International Searching Authority for corresponding International Application No. PCT/EP2015/081380 dated Apr. 15, 2016; 9 pages.

Alcatel Lucent, Wi-Fi Roaming—Building on ANDSF and Hotspot2. 0, (Feb. 27, 2012) XP002677915; pp. 1-45. Http://www.alcatel-lucent.com.

European Telecommunications Standards Institute (ETSI), Technical Specification "Universal Mobile Telecommunications System (UMTS); Access Network Discovery and Selection Function (ANDSF) Management Object (MO) (3GPP TS 24.312 version 12.6.1 Release 12)," (Oct. 1, 2014) vol. 3GPP CT 1, No. V12.6.1, XP014223573; 356 pages.

U.S. Appl. No. 15/540,912, filed Jun. 29, 2016, Inventor(s): Brown et al.

Application and Filing Receipt for U.S. Appl. No. 15/127,555, filed Sep. 20, 2016, Inventor(s): Brown et al.

Application and Filing Receipt for U.S. Appl. No. 15/101,776, filed Jun. 3, 2016, Inventor(s): Ramirez et al.

Alcatel-Lucent, "Selection of Target PLMN in case of Shared HeNB," 3GPP Draft; R3-120771_RANSHRG, 3$^{rd}$ Generation Partnership Project (3GPP), vol. RAN WG3, No. San Jose del Cabo, Mexico (Mar. 26-30, 2012); XP050669122; 3 pages. http://www.3gpp.org/ftp/tsg_ran/WG3_Iu/TSGR3_75bis/Docs/ Retrieved on Apr. 2, 2012.

Huawei, "Discussion on RAN sharing for H(e)NB," 3GPP Draft; R3-112779_DISC_RANSHARING, 3$^{rd}$ Generation Partnership Project (3GPP), vol. RAN WG3, No. San Francisco, USA (Nov. 14-18, 2011); XP050566020; 4 pages.

* cited by examiner

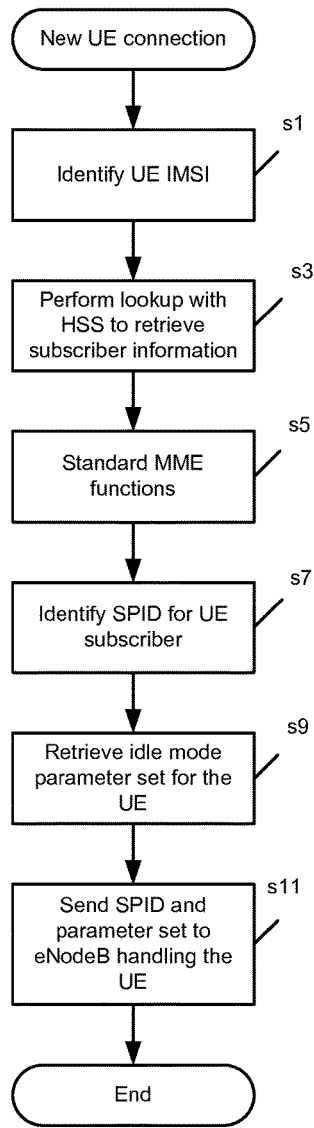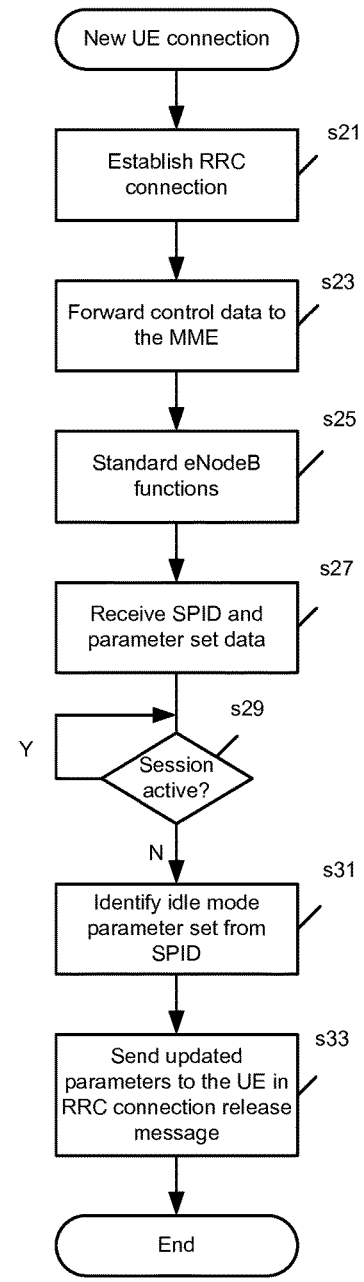
Fig. 11
Fig. 12

CELL RESELECTION

CROSS-REFERENCE TO RELATED APPLICATIONS

The present application is a National Phase entry of PCT Application No. PCT/EP2015/081380, filed on 29 Dec. 2015, which claims priority to EP Patent Application No. 14250121.2, filed on 30 Dec. 2014, which are hereby fully incorporated herein by reference.

TECHNICAL FIELD

The present disclosure relates to cellular networks and in particular to a method for setting idle more reselection behavior in a network.

BACKGROUND

In "Long-Term Evolution" (LTE) cellular networks, wide area macrocell devices are known as eNodeBs and transmit LTE signals over a large geographic areas. Due to range limitations, a number of eNodeBs are deployed such that the edges of coverage overlap so that continuous coverage can be achieved.

User devices, such as cellular telephones, tablets and computers with cellular network adaptors, known as User Entities (UEs) connect to an eNodeB in order to access the cellular network.

In LTE, the UE has three valid states: switched off, idle mode and connected mode. Switched off represents being completely disconnected from the cellular network. In connected mode, the UE is actively engaged in a communication session with another correspondent node via the eNodeB and the LTE network core. In idle mode, the UE is not actively transmitting or receiving, but is connected to an eNodeB and ready to switch to connected mode to enable a communication session, e.g. making a voice call or starting a data session.

In idle mode the UE, rather than the eNodeB, is responsible for selecting an eNodeB for idle mode association. The UE will typically assess the signal strength to each of the available eNodeBs to determine the eNodeB having the strongest signal and associate with that eNodeB. Since the UE is mobile, the selected eNodeB may change as the relative distances and signal strengths between the UE and the eNodeBs changes.

The UEs receive rules and thresholds governing the initial connection and the manner in which a UE decides to reselect from the connected eNodeB to a different eNodeB. Each eNodeB is configured to transmit the same set of rules and thresholds to all connected UEs in the service area so that all UEs follow the same criteria but decisions are dependent on the observed variables. Each eNodeB uses System Information Block (SIB) messages to broadcast the rules to its connected active mode and idle mode UEs.

The SIBs are defined in 3GPP TS 36.321 V9.3.0 (R9) and 3GPP TS 36.331 V9.3.0 (R9) and each of the SIBs relates to a different aspect of the LTE network. For example, SIB 1 relates to general information about the available PLMNs, SIB 3 and SIB 5 relate to cell-reselection parameters.

SIB messages are broadcast by an eNodeB and received by any UE which is connected to that eNodeB.

Due to the broadcast nature of the SIBs, the idle mode reselection behavior of all connected UEs will be the same. In certain circumstances, this homogenous behavior can be disadvantageous to the mobile network.

Embodiments of the present disclosure address this homogenous behavior.

SUMMARY

In one aspect, the present disclosure provides a method for providing dedicated idle mode reselection parameters to a cellular device in a cellular network, the method comprising the following performed by a base station of the cellular network: determining a subscriber group for the cellular device; identifying a set of operating parameters associated with the cellular device in accordance with the determined subscriber group, wherein the parameters alter the idle mode reselection behavior of the cellular device; and sending the set of parameters so as to override any existing parameter values stored at the cellular device, wherein the cellular device performs idle mode reselection in accordance with the override parameters.

In another aspect, the present disclosure provides apparatus for providing dedicated idle mode reselection parameters to a cellular device in a cellular network, the apparatus comprising: determining means for determining a subscriber group for the cellular device; identifying means for identifying a set of operating parameters associated with the cellular device in accordance with the determined subscriber group, wherein the parameters alter the idle mode reselection behavior of the cellular device; and transmission means for sending the set of parameters to the cellular device so as to override any existing parameter values stored at the cellular device, wherein the cellular device performs idle mode reselection in accordance with the override parameters.

BRIEF DESCRIPTION OF THE DRAWINGS

Embodiments of the present disclosure will now be described with the aid of the accompanying figures in which:

FIG. 11 is a flowchart of the processing of an MME to retrieve dedicated idle mode reselection parameters for a UE.

FIG. 12 is a flowchart showing the processing of an eNodeB to deliver dedicate idle mode reselection parameters for a connected UE.

DESCRIPTION

In the first embodiment, eNodeBs are configured to send customized control parameters to some connected UEs in order to override the standard parameters controlling idle mode reselection behavior.

Figure 1:
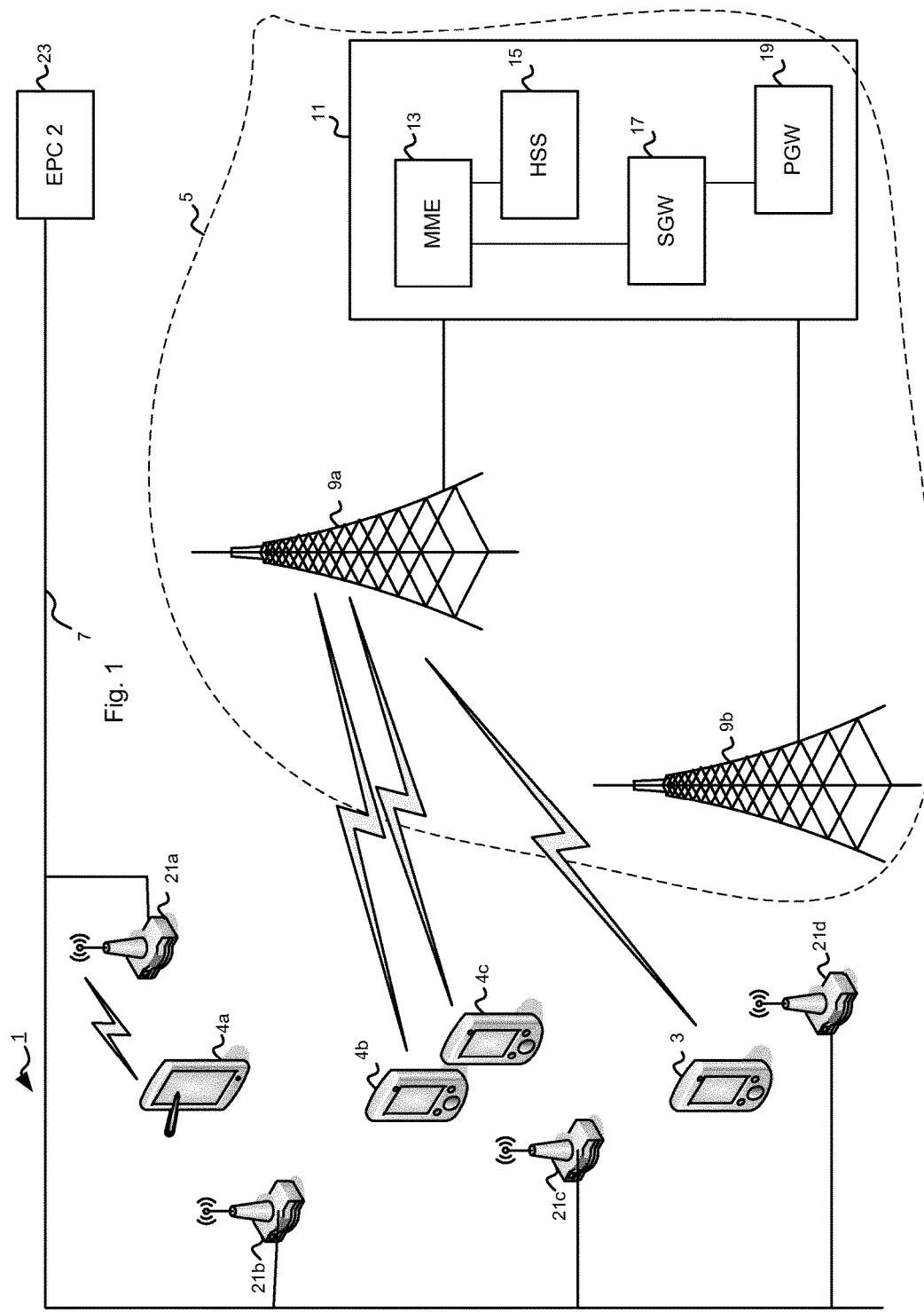
FIG. 1 shows a geographical location in which a number of UEs are located within connectivity range of a macrocell network and a small cell network.

FIG. 1 shows a geographical area in which a number of User Entities (UEs) 3, 4 are located within data connectivity range of a number of cellular mobile networks 5, 7. A first cellular mobile network is a macrocell mobile network 5 having a number of macrocell eNodeBs 9 for providing connectivity to UEs via a Long Term Evolution (LTE) wireless cellular protocol. Each eNodeB 9 is connected to an Evolved Packet Core (EPC) 11 containing a Mobile Management Entity (MME) 13, a Home Subscriber Server (HSS) 15, a Serving Gateway (SGW) 17 and a Packet Gateway (PGW) 19. An example macrocell mobile network is a network provided by Everything Everywhere (EE) in the United Kingdom.

In this embodiment, a second mobile network is also present and is formed of a number of LTE small cells (the term "small cells" include picocells and femtocells) eNodeBs 21 each connected to a second EPC 23. In this small cell network 7, each small cell 21 also provides data connectivity to UEs 4 using the LTE protocol. However, the range of each small cell 21 is smaller than a macrocell enodeB 9 and therefore cannot match the same geographic coverage as a macrocell eNodeB 9 of the first network 5 without an increase in the number of small cells. Picocells typically have a range of 100 to 200 m and femtocells have a range of 10-20 m. An example of the small cell network is the BT small cell network in the United Kingdom.

To more easily distinguish between the two different types of eNodeB, macrocell eNodeBs 9 will be referred to as macrocells 9 and small cells eNodeBs will be referred to as small cells 21. The term eNodeB will be used for general discussion of eNodeBs.

To overcome the range limitations of the small cell network 7, a commercial arrangement between the operator of the macrocell network 5 and the operator of the small cell network 7 allows the macrocells 9 of the macrocell network 5 to "fill in the gaps" of the network coverage of small cells 21 in the small cell network 7. Therefore, under the agreement, UEs 4 of subscribers of the small cell network 7, are permitted to connect to macrocells 9 of the macrocell network 5 in order to access the macrocell network 5 when connectivity to the small cell network 7 is not available, for example, due to signal reception or coverage issues. UEs 4 of the small cell network can use the macrocell network for both LTE communication and also 2G/3G services such as Call Switched Fall Back (CSFB).

In FIG. 1, subscribers of both the EE and BT networks are shown. UEs 3 belong to EE subscribers and UEs 4 belong to subscribers of the BT network. In accordance with the commercial agreements, macrocells 9 of the macrocell network 5 will provide connectivity to both customer UEs 3 of the macrocell network 5 and also to customer UEs 4 of the small cell network 7. In contrast, the small cell network 7 will only accept UEs of subscribers of the small cell network 7 and will not allow customers of the macrocell network 5 to connect to them.

Due to the regulation of frequency spectrum in many countries, the macrocell network 5 and the small cell network 7 operate using different ranges of LTE frequency spectrum in accordance with radio spectrum licenses maintained by a regulatory body such as OFCOM in the UK. For example, the macrocell network 5 is authorized to operate in LTE bands located in the 800 Mhz, 1800 Mhz and 2600 Mhz spectrum using Frequency Division Duplexing (FDD) and the small cell network operates only in the 2600 Mhz band, also using FDD.

In contrast to active mode handover where the eNodeB selects the handover eNodeB, in idle mode reselection, a UE 3, 4 is responsible for associating with one of the observed eNodeBs. The UE makes the reselection decision in accordance with handover rules and thresholds received from the currently connected eNodeB, defining the reselection behavior, and in particular by applying those rules to locally observed conditions such signal strength and signal quality. In general, the candidate eNodeB with the strongest combination of signal strength and signal quality as observed at the UE's present location. As the UE's location changes, there will be a corresponding change in the observed signal strength and signal quality conditions to all available eNodeBs and therefore the UE may determine that it is beneficial to transfer away from the current eNodeB to a different eNodeB which is now deemed to offer better service.

In borderline reception areas between two eNodeBs with similar signal characteristics, slight fluctuations in the observed signal conditions may result in undesirable switching between two eNodeBs. To address this, the rules provided to the UEs 3, 4 typically contain one or more margin values which are used to determine switching thresholds. New eNodeBs are not considered for reselection unless their signal characteristics exceed the combination of the current eNodeB signal characteristics and the margins.

Using standard idle mode reselection behavior, the second network 7 may be under-utilized. Although the UEs 4 of subscribers of the small cell network 7 are authorized to access the small cell network 7, due to the difference in transmission power between a macrocell 9 and a small cell 21, the UE 4 may choose to connect to the macrocell network 5 because it provides a better signal, or may stay connected to the macrocell network in preference to reselecting to a small cell of the small cell network.

In FIG. 1, the UEs 3, 4 are shown in idle mode. UE 3 is a subscribed to the macrocell network and connected to macrocell 9a. UE 4a, 4b, 4c and 4d are subscribers to the small cell network. UE 4a is connected to small cell 21, however, due to the commercial agreement, UEs 4b and 4c are connected to the macrocell 9a.

Figure 2:
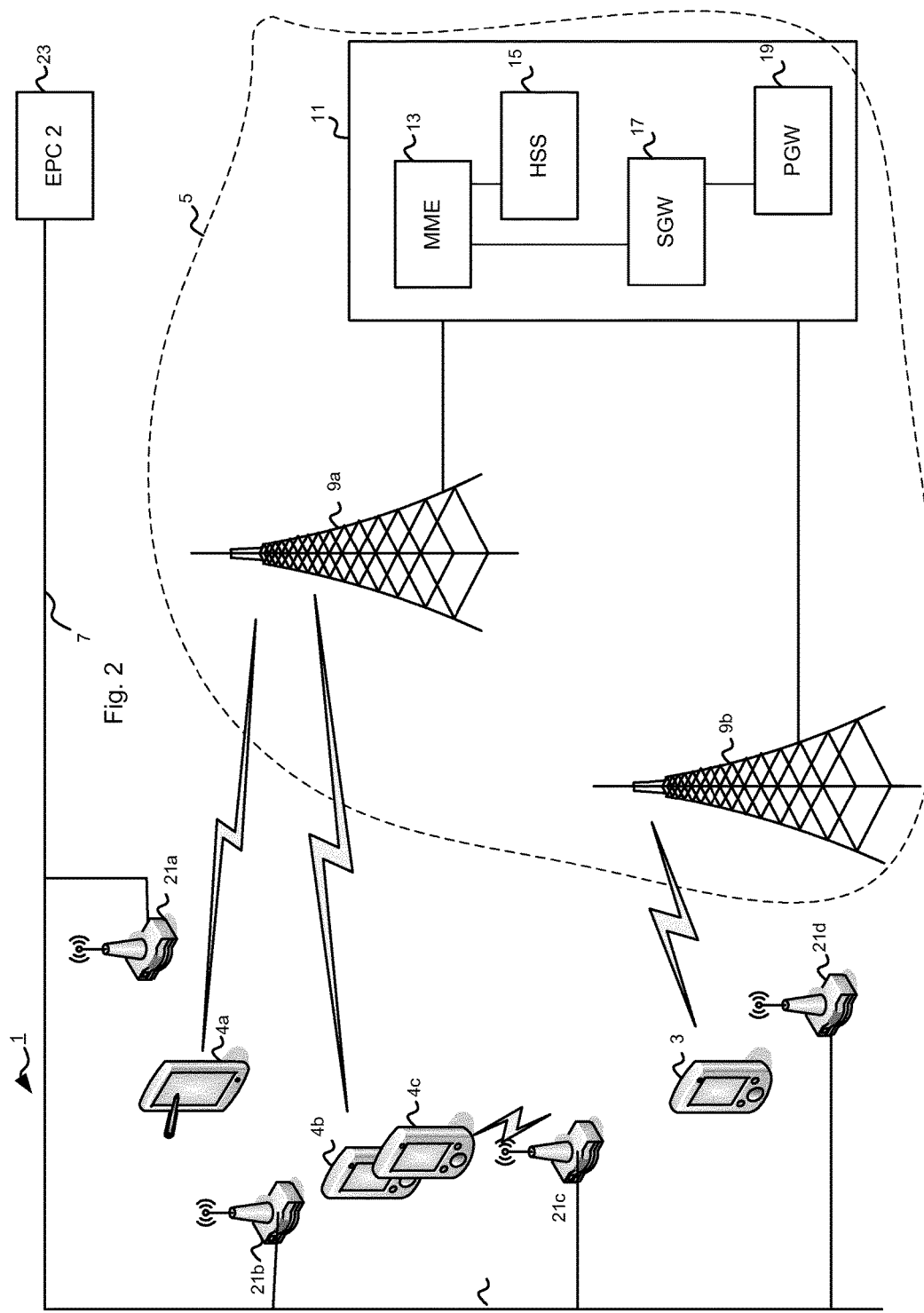
FIG. 2 shows the same network FIG. 1 wherein the UEs have performed idle mode reselection in a conventional manner.

FIG. 2 shows the network of FIG. 1 for an example scenario where the UEs 3, 4 have changed location and carried out the usual idle mode reselection process to refresh the current connected macrocell 9.

UE 3 has moved from macrocell 9a to macrocell 9b. Although it is closer to small cell 21d, UE 3 is not a subscriber to the small cell network 7 and therefore cannot connect to the small cell network via small cell 21d. UE 3 reselects to macrocell 9b because the signal strength is stronger than that of the macrocell 9a.

UE 4a is a subscriber of the small cell network and therefore can access both the macrocell network 5 and the small call network 21. This UE 4a was connected to small cell 21a but has now reselected to the macrocell 9a.

UE 4b is a subscriber of the small cell network and was connected to macrocell 9a. Despite moving close to small cells 21b and 21c, the UE 4b has determined that the signal strength to the 9a is sufficiently high and therefore has decided to stay attached to macrocell 9a.

UE4c is connected to small cell 21c. Although it is in a very similar location to UE 4b, the signal strength to the small cell 21c is sufficiently high for the UE 4c to choose the small cell 21c instead of remaining connected to macrocell 9a.

In this example, two of the three shown UEs have chosen to remain connected to the macrocell 9a of the macrocell network 5 instead of reselecting to a small cell 21 because the UEs 4 all operate in accordance with the same reselection parameters defined by the macrocell 9a. These are the same reselection parameters which are defined for subscriber UEs 3 of the macrocell network.

To improve utilization of the small cell network 7, there is therefore a requirement for establishing different behavior between the two subscriber groups to allow UEs 4 of the small cell network 7 to use the small cells 21 as often as possible. In particular:

Subscriber UEs 4 of the small cell network 7 should more readily connect to the second cell network 7 in the following cases:
  when performing the initial cell connection, UEs 4 should look to connect onto a small cell 21 of the small cell network 7 in preference to a macrocell 9 of the macrocell network 5;
  when connected to a macrocell 9 of the macrocell network 5, the UEs 4 should readily move to a small cell 21 of the small cell network 7; and
  when connected to a small cell 21 of the second network 7, the UEs 4 should try to remain with the currently connected small cell 21 of the small cell network 7 for as long as possible or switch to another small cell 21 of the small cell network 7 in preference to connecting to a macrocell 9 of the macrocell network 5; and Subscriber UEs 3 of the macrocell network 5 cannot connect to the small cell network 7 and therefore handover and idle mode reselection functions continue as normal.

Figure 3:
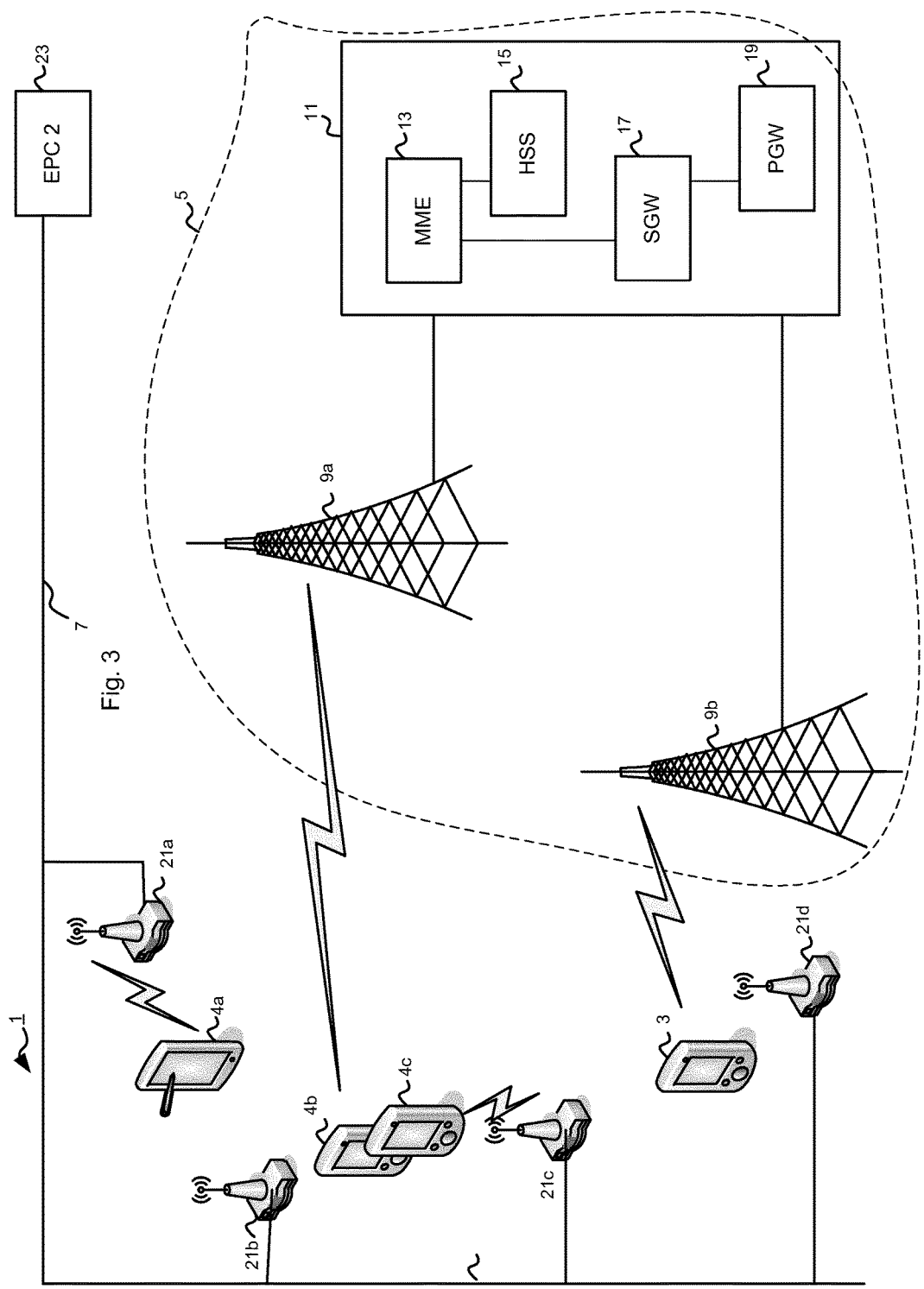
FIG. 3 shows the same network of FIG. 1 wherein the UEs have performed idle mode reselection in accordance with a first embodiment.

FIG. 3 shows the effect of altering the idle mode reselection parameters of the UEs 4 in accordance with the desired behavior outlined above.

The UE 3 subscribed to the macrocell network is not permitted to connect to the small cell network 7 and therefore can only connect to the eNodeBs of the macrocell. In this example the UE 3 has connected to the macrocell 9b of the macrocell network 5.

The UE 4a remains connected to small cell 21a in preference to connecting to the macrocell 9a.

The UE 4b remains connected to macrocell 9a.

The UE 4c has reselected to the small cell 21c away from the macrocell 9a.

With this behavior, the small cell network 7 utilization increases because UEs 4 are biased to selecting small cells 21 in preference to macrocells 9, even though the signal strength scans may indicate that the macrocell 9 may provide a better service.

Since idle mode reselection process is carried out by the UEs 4 themselves, the bias to use small cells 21 of the small cell network 7 must be present in the UEs.

One method to achieve this, is to pre-program all UEs belonging to subscribers of the small cell network 7 to have this bias. For example each UE, or USIM of a UE subscriber of the small cells network 7 in configured to contain a pre-stored offset value or set of reselection offsets which are applied by the UE 4 to the detected signal characteristics of any detected small cells in the local vicinity in such a way as to promote the probability of reselecting to a small cell and demoting the probability of reselected to a macrocell.

Such a scheme would be a substantial undertaking since all the USIMs must be distributed to customers. Furthermore, if the SIMs cannot be updated after distribution, the offset settings are static and can only be updated by distributing new SIM cards which would be expensive and disruptive to subscribers.

In the first embodiment, in order to achieve differential behavior for the UEs 4, the macrocell of the macrocell network 5 are modified to send different sets of reselection parameters to the small cell network UEs 4 in addition to the reselection parameters that set the standard behavior of macrocell subscriber UEs 3.

Conventionally, reselection configuration data is sent by a macrocell to all connected UEs through a number of broadcasted messages known as a Master Information Block (MIB) and System Information Blocks (SIBs). Any UE 3, 4 connected to a macrocell 9 will receive the reselection configuration data and operate in accordance with the received rules and criteria.

System Information Blocks

The format and structure of SIBs are defined by the 3GPP standard TS36.331 and includes:

| | |
|---|---|
| SIB1 | i) Cell Access Related Information - PLMN Identity List, PLMN identity, TA Code, Cell identity and Cell status |
| | ii) Cell Selection Information - Minimum Receiver Level |
| | iii) Scheduling Information - SI message type and periodicity, SIB mapping info, SI Window length |
| SIB 2 | i) Access Barring Information - Access Probability factor, Access Class Barring List, Access Class Barring Time |
| | ii) Semi Static Common Channel Configuration - Random Access Parameter, PRACH Configuration |
| | iii) UL Frequency Information - UL EARFCN, UL Bandwidth |
| SIB 3 | Information/Parameters for intra-frequency cell reselections. |
| SIB 4 | Information on intra-frequency neighboring cells |
| SIB 5 | Information on inter-frequency neighboring cells |
| SIB 6 | Information on reselection to UMTS (UTRAN) cells |
| SIB 7 | Information for reselection to GSM (GERAN) cells |
| SIB 8 | Information for reselection to CDMA2000 systems |
| SIB 9 | Home eNodeB name - LTE femtocell applications |
| SIB 10 + | ETWS (Earthquake and Tsunami Warning System) |
| SIB 11 | |
| SIB 12 | Commercial Mobile Alerting System information. |

System Information Blocks 1, 3 and 5 are particularly relevant to the idle mode reselection functionality of the UEs 4 in this embodiment where the macrocell network 5 and small cell network 7 operate on different frequencies and therefore the macrocells 9 and small cells 21 are inter-frequency neighboring cells.

SIB 1 contains information regarding whether or not a UE is allowed to access eNodeB based on the associated PLMN. SIB 3 carries cell reselection information and SIB 5 is concerned with cell reselection and handover parameters such as E-UTRA LTE frequencies, other neighbor cell frequencies from other Radio Access Technologies.

Returning to the example network shown in FIG. 1, an EE macrocell 9a will send SIB 1 messages specifying that all UEs (due to the broadcast nature of the transmissions) can only connect to other EE macrocells, and cannot connect to another PLMN such as Vodafone or O2 macrocell.

The SIB 3 messages carry cell reselection information common for intra-frequency, inter-frequency and inter-RAT cell re-selection while SIB 5 messages specify which frequencies the UE should scan to look for carrier signals of valid reselection macrocells, etc.

Figure 4:
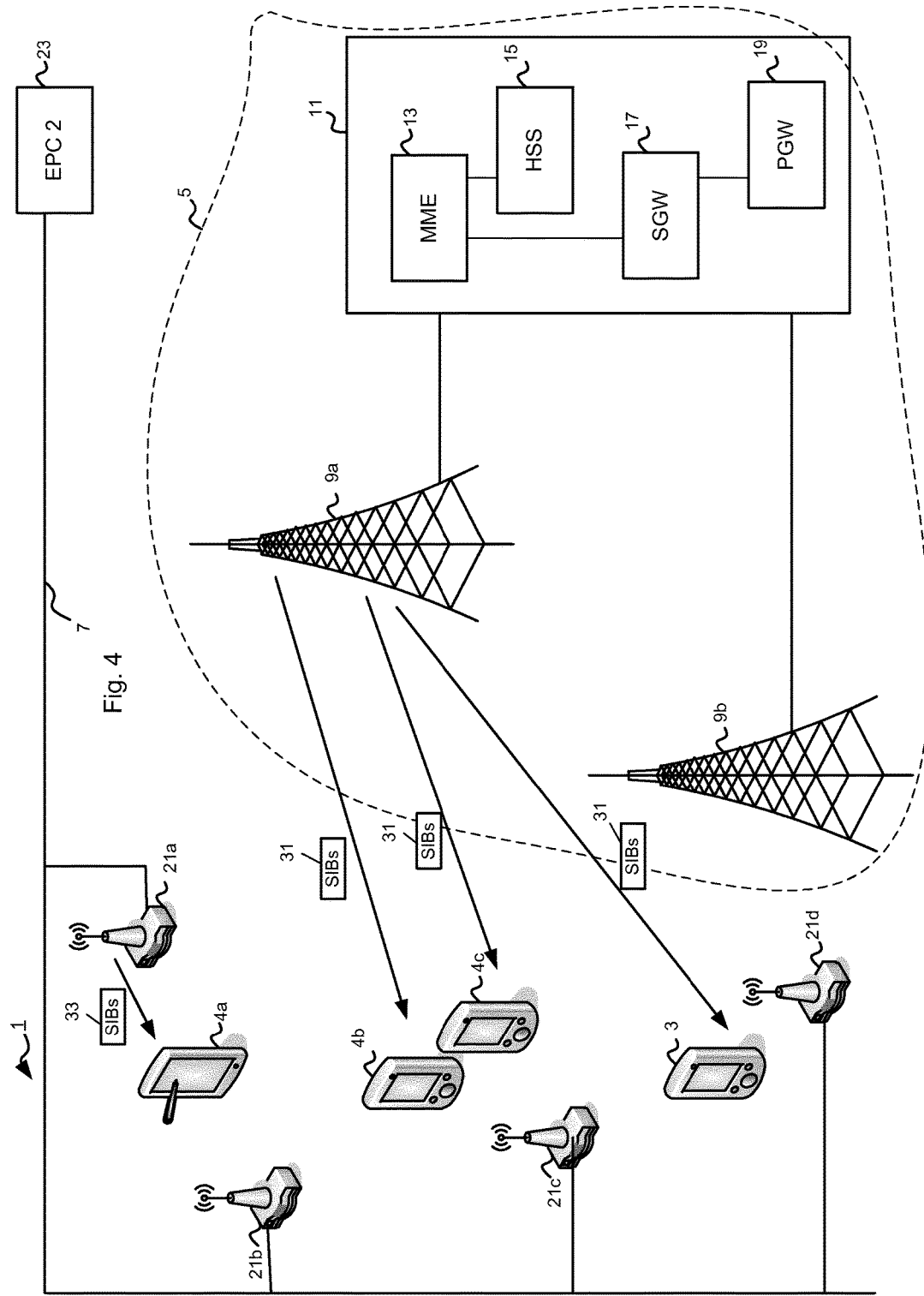
FIG. 4 shows the network of FIG. 1 in the conventional case whereby eNodeBs are configured to broadcast System Information Block data to any idle mode connected UEs.

For SIB 5, the following parameters are defined:
InterFreqCarrierFreqInfo:
dl-CarrierFreq: The carrier frequency list for the UE to search for neighboring cells
q-RxLevMin: This is the minimum Received Signal, Received Power (RSRP) value of the inter-frequency cell and the signal strength to an eNodeB must be higher than this value before the eNodeB is considered as a reselection candidate. This parameter can take a value of −70 to −22 dBm.
p-Max: This is the maximum allowed UL transmit power of the cell
t-ReselectionEUTRA: defines the time to trigger for cell reselection. Value 0 to 7 sec.
t-ReselectionEUTRA-SF: scaling factors for Medium and High mobility
threshX-High: Threshold (in dB) used by UE for cell re-selection to a HIGHER priority
threshX-Low: Threshold (in dB) used by UE for cell re-selection to a LOWER priority
allowedMeasBandwidth: defined in terms of Resource blocks associated with a specific channel bandwidth
cellReselectionPriority: defines the absolute priority of the frequency layer
neighCellConfig: information regarding the neighboring cells
q-OffsetFreq: defines the RSRP measurement offset, applied to all cells on the specified RF carrier
interFreqBlackCellList: the mentioned cells are no considered for cell reselection FIG. 4 shows SIBs being sent to the UEs 3, 4. As will be described in more detail later, the SIBs are stored in the MME 13 of the EPC 11 and pushed to each of the macrocells 9 of the macrocell network 5. Each macrocell 9 then broadcasts the SIBs to all connected UEs which in FIG. 4 are UEs 3, 4b and 4c.

An example of the contents of a SIB 5 message is shown below.

```
System Information Block_5
BCCH-DL-SCH-Message : {
    message c1 : SystemInformation : {
        criticalExtensions system Information-r8 : {
            sib-TypeAndInfo {
                sib5 : {
                    interFreqCarrierFreqList {
                        dl-CarrierFreq 1800
                        q-RXLevMin −65,
                        t-ReselectionEUTRA 4,
                        t-ReselectionEUTRA-SF {
                            sf-Medium 0.75
                            sf-High 0.5
                        },
                        threshX-High 20,
                        threshX-low 6,
                        allowedMeasBandwidth mbw25,
                        presenceAntennaPort1 TRUE
                        cellReselectionPriority 1,
                        q-OffsetFreq dB0
                    }
                }
            }
        }
    }
}
```

The UEs 3, 4b and 4c receiving this SIB will store the parameters and thresholds in order to define their idle mode reselection behavior.

UE 4a is connected to small cell 21a which is turn connected to an MME (not shown) in EPC 23. The contents of the SIB message will differ to the SIBs broadcast by the macrocell 9a.

The SIBs provide general information to all of the UEs connected to the eNodeB and are broadcast periodically so that using SIBs alone the rules for all UEs is the same and UE behavior varies only according to the signal strength values.

Radio Resource Control (RRC)

In this embodiment, the macrocell 9 uses Radio Resource Control (RRC) messages to send modified idle mode reselection parameters to the different groups of UEs 3, 4. Specifically the RRCConnectionRelease message.

RRC is a control plane signaling set of protocols between the eNodeB and the UE. RRC typically occurs when a UE 3, 4 connects to an eNodeB and also when a UE leaves active mode and enters idle mode. Unlike the broadcast SIB messages, the RRC messages can be personalized for each UE because the eNodeB learns a subscriber group of the UE and will receive different idle mode reselection parameters based on a subscriber group associated with that UE.

Figure 5:
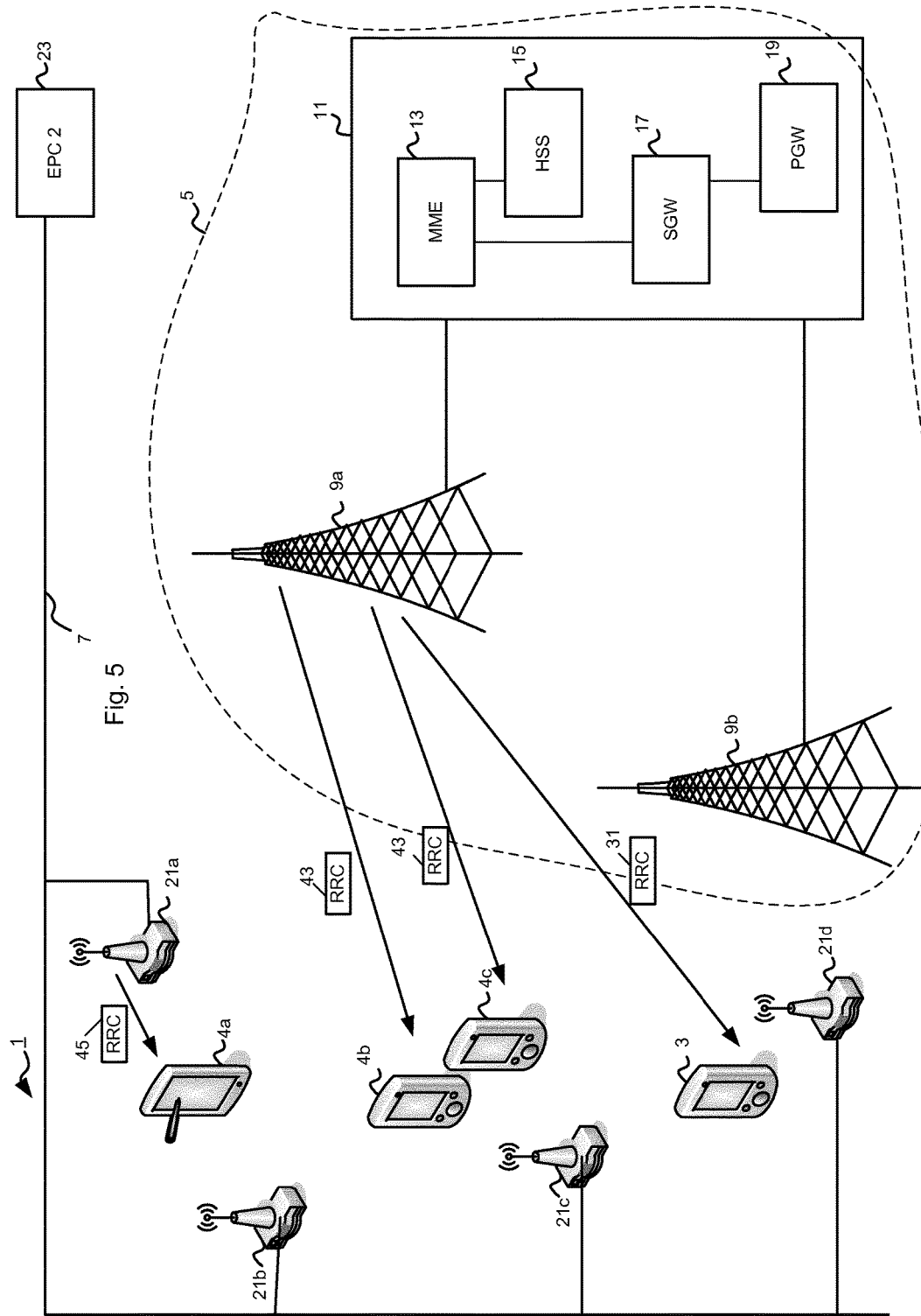
FIG. 5 shows the network of FIG. 4 where the eNodeBs are configured to send frequency priority lists to any idle mode connected UEs.

FIG. 5 shows a network where a macrocell 9 is sending two different sets of RRC messages and a small cell 21 of the small cell network 7 sends one set of RRC messages.

One use of the RRC messages is to supplement SIB information with a reselection priority for each available frequency of the cellular network. Most mobile network operators own more than one frequency band of LTE spectrum and therefore a UE will have a choice of frequencies for reselection. For example, the EE network owns three bands of spectrum in the 800 Mhz, 1800 Mhz and 2600 Mhz bands. With SIB, the priority for a UE to select one of the frequencies is the same. However, if the network operator wishes to prioritize one of its frequency bands over another, then it can send a new parameter using RRC, for example with the format:

```
IdleModeMobilityControlInfo
    freqPriorityListEUTRA
        carrierFreq
        cellReselectionPriority
```

For example, in FIG. 5, the macrocell 9a sends RRC message 41 containing new parameters to prioritize the 2600 band above the 800 band.

Example contents of RRC message 41.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 800,
                        cellReselectionPriority 7
                    },
                    {
                        CarrierFreq 2600,
                        cellReselectionPriority 5
                    }}
                t320 min180
            }}}
```

For UE 4b and UE 4c which are subscribers of the small cell network 7 but are currently connected to the macrocell 9a, the macrocell 9a sends a different RRC message 43 so that a different set of priorities are defined.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 7
                    },
                    {
                        CarrierFreq 800,
                        cellReselectionPriority 5
                    }}
                t320 min180
}}}
```

In FIG. 5, the small cells 21 are also configured to send RRC messages 45 with frequency priority lists to any connected UEs.

Parameter Update Procedure

In the first embodiment, the macrocell 9 of the macrocell network 5 is further configured to modify the behavior of each UEs belonging to subscribers of the small cell network in idle mode reselection to be biased towards the small cell network 7. The RRC mechanism is used to override the existing SIB1/SIB3/SIB5 parameters previous sent in SIB broadcasts 31 which govern reselection.

Since RRC messages are selective, a macrocell 9 can configure any UEs 3 of the macrocell network 5 in accordance with the SIBs 31 and RRC messages 41 containing frequency priority list, but UEs 4 of small cell mobile network 7 can be configured to utilize the small cell network 7 in preference to the macrocell network 5.

Figure 6:
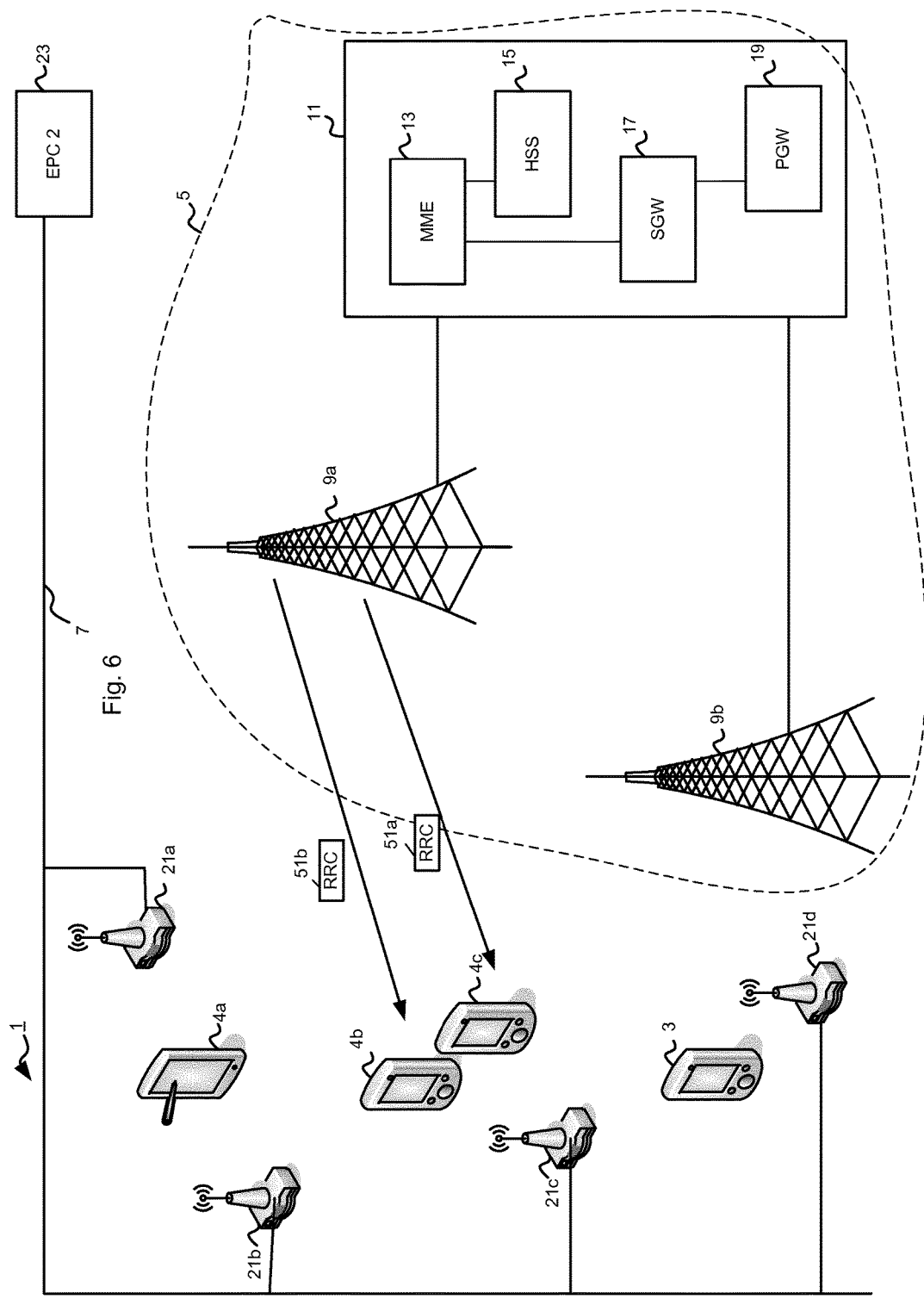
FIG. 6 shows the network of FIG. 5 wherein additional parameters by the eNodeB to some UEs to alter UE idle mode reselection behavior in the first embodiment.

FIG. 6 shows the network 1 where the macrocell 9a sends updated parameters in a further RRC message 51 to UEs 4b and 4c. However, the macrocell 9a does not send the RRC message 51 to UE 3 because that UE 3 is not a subscriber of the small cell network 7.

In this embodiment, the RRC message 51 includes updates to the parameters q-RxLevMin, Thresh-High and Thresh-Low so that the UE 4a, 4b more readily reselects to a small cell 21.

Furthermore, the macrocell 9a sends different sets of parameters to different UEs 4b 4c in different RRC messages 51a, 51b. While the updates all have the general effect of causing the UEs 4 to be biased to the small cell network 7, variations in the exact values improve utilization of the small cell network 7 through diversity in the reselection decisions made by the UEs 4.

An example of a RRC message 51a sent from the macrocell 9a to UE 4b is shown below.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin -65,
                        thresh-High 20,
```

-continued

```
                        threshX-Low 6
                    }}
                t320 min180
}}}
```

An example of a RRC message 51b sent from the macrocell 9a to UE 4c is shown below.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin -40,
                        thresh-High 30,
                        threshX-Low 0
                    }}
                t320 min180
}}}
```

The RRC message 51a sent to the UE 4c and the RRC message 51b send to the UE 4b causes different behavior idle mode reselection behavior in the UEs 4b and 4c, even if they are located as the same position relative to surrounding eNodeBs 9 and small cells 21.

In FIG. 6, after reception of the RRC messages 51a and 51b by UE 4b and UE 4c respectively, UE 4b will be configured with a qrxLevmin value of −65 dB and UE 4c is configured with a qRxLevMin value of −40 dB which overrides the default value sent in the earlier SIB messages 31.

When both UE 4b and UE 4c move away from macrocell 9a towards small cells 21b and 21c as shown in FIG. 3, each UE 4b, 4c will use the updated parameters to set their reselection behavior.

UE4b will re-select to a neighboring small cell in accordance with an S-criteria when:
eNodeB_current_signal<threshSrcLow (=6)+Qrxlevmin (=−65)+PcompServing(=0)=−59 dB AND
eNodeB_candidate_signal>thresXlow(=12)+QRx-LevMinInterF (=−110 PcompNeighbor (=0)=−98 dB during Treselection=4 seconds Meanwhile, UE4c will select a neighboring small cell when:
eNodeB_current_signal<threshSrcLow (=6)+Qrxlevmin (=−40)+PcompServing(=0)=−34 dB AND
eNodeB_candidate_signal>thresXlow(=12)+QRx-LevMinInterF (=−110 PcompNeighbor (=0)=−98 dB during Treselection=4 seconds Therefore even though both UEs are in the same location, due to the different parameters affecting the idle mode reselection behavior, UE 4b will remain attached to macrocell 9a for longer than UE 4c because the signal strength to the eNodeB9a must drop to −59 dB before the UE 4b will start searching for a reselection target small cell.

Figure 7:
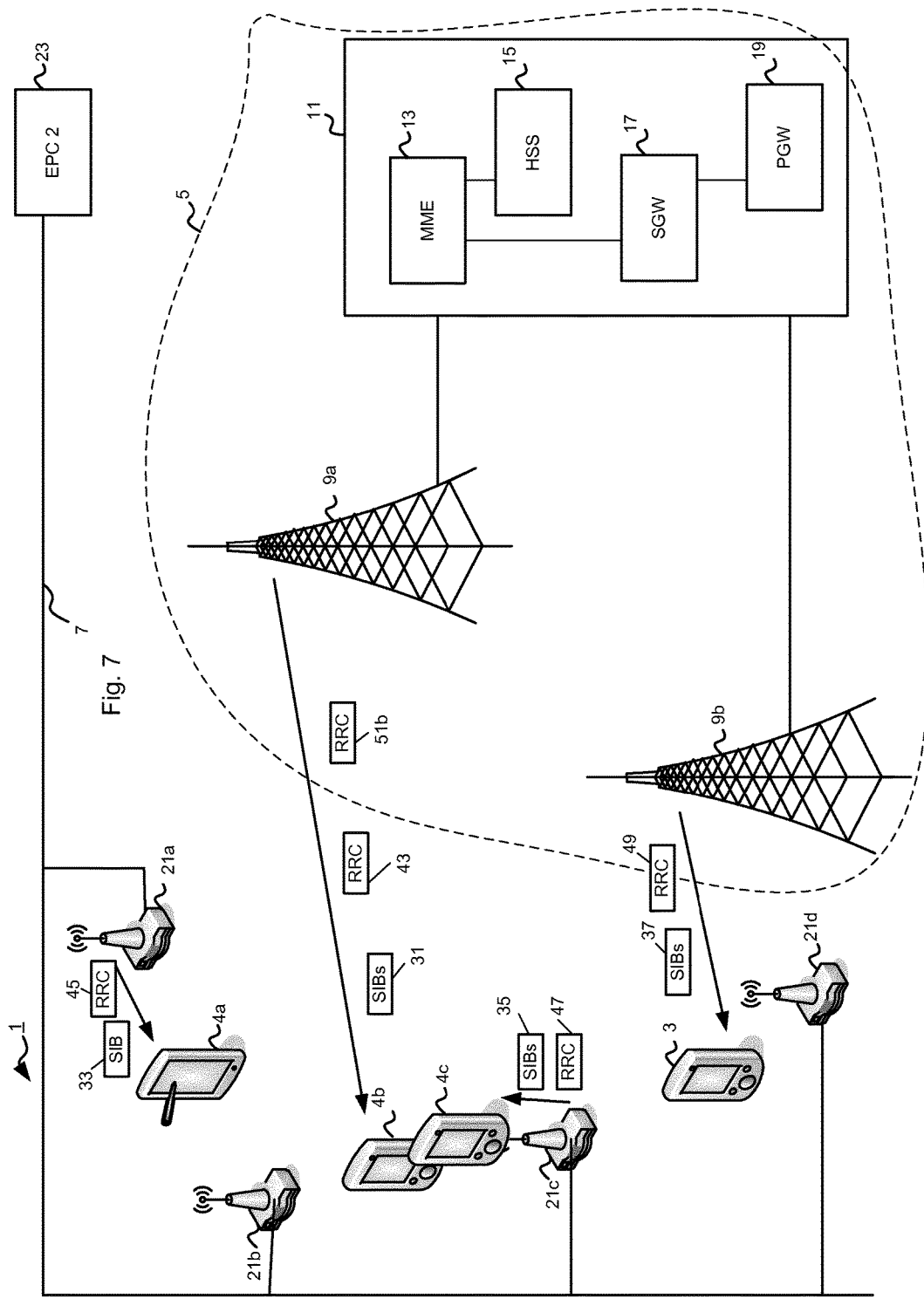
FIG. 7 shows the network of FIGS. 4, 5 and 6 with an overview of the message exchange between the eNodeBs and UEs.

FIG. 7 is similar to FIG. 3 and shows the transmission of messages from the small cells 21 and macrocells 9 in the network 1 after the UEs 4 have moved.

UE 4a remains connected to small cell 21a because the idle mode reselection parameters sent in the SIB message 33 and RRC message 45 bias the UE 4a to stay connected to a small cell 21.

UE 4b is still connected to the macrocell 9a due to the parameters sent in SIB message 31, RRC message 43 and RRC message 51b as described above so that even though it is biased to the small cells 21, it has chosen to stay connected to the macrocell 9a.

UE 4c has performed idle mode reselection as defined in the set of parameters received from the macrocell 9a in SIB message 31, RRC message 43 and RRC message 51a as described earlier to decide to connect to small cell 21c. It now receives new SIB messages 35 and new RRC messages 47 from that small cell 21c which override the previous macrocell 9a settings.

UE 3 is not a subscriber of the small cell network and so only contained reselection parameters from the macrocell 9a via SIB message 31 and RRC message 43. In this case it has chosen to reselect to macrocell 9b and therefore now receives new parameters defined in SIB message 37 and RRC message 49.

Time Settings

Furthermore, the macrocell 9 can be configured to cause different behavior in the UEs 4 at different times of the day.

For example at 10 am on a given day, the RRC message 51b to UE 4b may be:

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin −65,
                        thresh-High 20,
                        threshX-Low 6
                    }}
                    t320 min180
                }}}
``` and the RRC message 51a to UE4c may be:

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin −40,
                        thresh-High 30,
                        threshX-Low 0
                    }}
                    t320 min180
                }}}
```

However, at 19:00 different conditions can be sent to UEs to cause different idle mode reselection behavior.

For example for UE 4b, no change is required so the same RRC message 51b is sent.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin −65,
                        thresh-High 20,
                        threshX-Low 6
                    }}
                    t320 min90
                }}}
```

However, for UE 4c, a new set of reselection parameters can be sent in a further RRC message 51a to alter the reselection behavior.

```
DL-DCCH-Message : {
    message c1 : rrcConnectionRelease : {
        rrc-TransactionIdentifier 3,
        criticalExtensions c1 : rrcConnectionRelease-r8 : {
            releaseCause other,
            idelModeMobilityControlInfo {
                freqPriorityListEUTRA {
                    {
                        CarrierFreq 2600,
                        cellReselectionPriority 5,
                        q-RXLevMin −30,
                        thresh-High 15,
                        threshX-Low 10
                    }}
                    t320 min90
                }}}
```

In this example, the changes are:
q-RXLevMin −40→q-RXLevMin −30
threshX-High 30→threshXHigh 15
threshX-Low 0→threshXLow 10

The effect of the changes is to cause UE 4c to be more resilient to reselecting to a new eNodeB during peak hours, for example this may be necessary where network stability is desirable.

At a later time, such as 10 am, the old settings are reverted and macrocell 9a sends RRC message 51a when the UE 4c next switches from active to idle mode.

In this way the reselection behavior can be dynamically altered by configuring the macrocell 9 to send different parameters to different sets of UEs and at different times.

Now that the behavior of the overall Evolved Packet System (EPS) has been described, the various components will now be described.

The main functional components in the first embodiment are the MME 13, HSS 15, macrocells 9 and UEs 4. These components will now be described in more detail below. The operation of the SGW 17 and PGW 19 are not modified in this embodiment and so they will not be described.

Core Components—MME and HSS

The Mobility Management Entity (MME) is the main control node in the EPC 11 and is responsible for signal exchanges between macrocells 9 and the EPC 11 and between UEs 3, 4 and the EPC 11. Operations include authentication of a UE using information in the HSS, establishing bearers between the UE and SGW 17 and PGW 19, Non-Access Stratum (NAS) mobility management, interworking support, handover support and supporting traditional services such as Circuit Switched Fall-Back (CSFB). The NAS mobility management is modified in the first embodiment.

Figure 8:
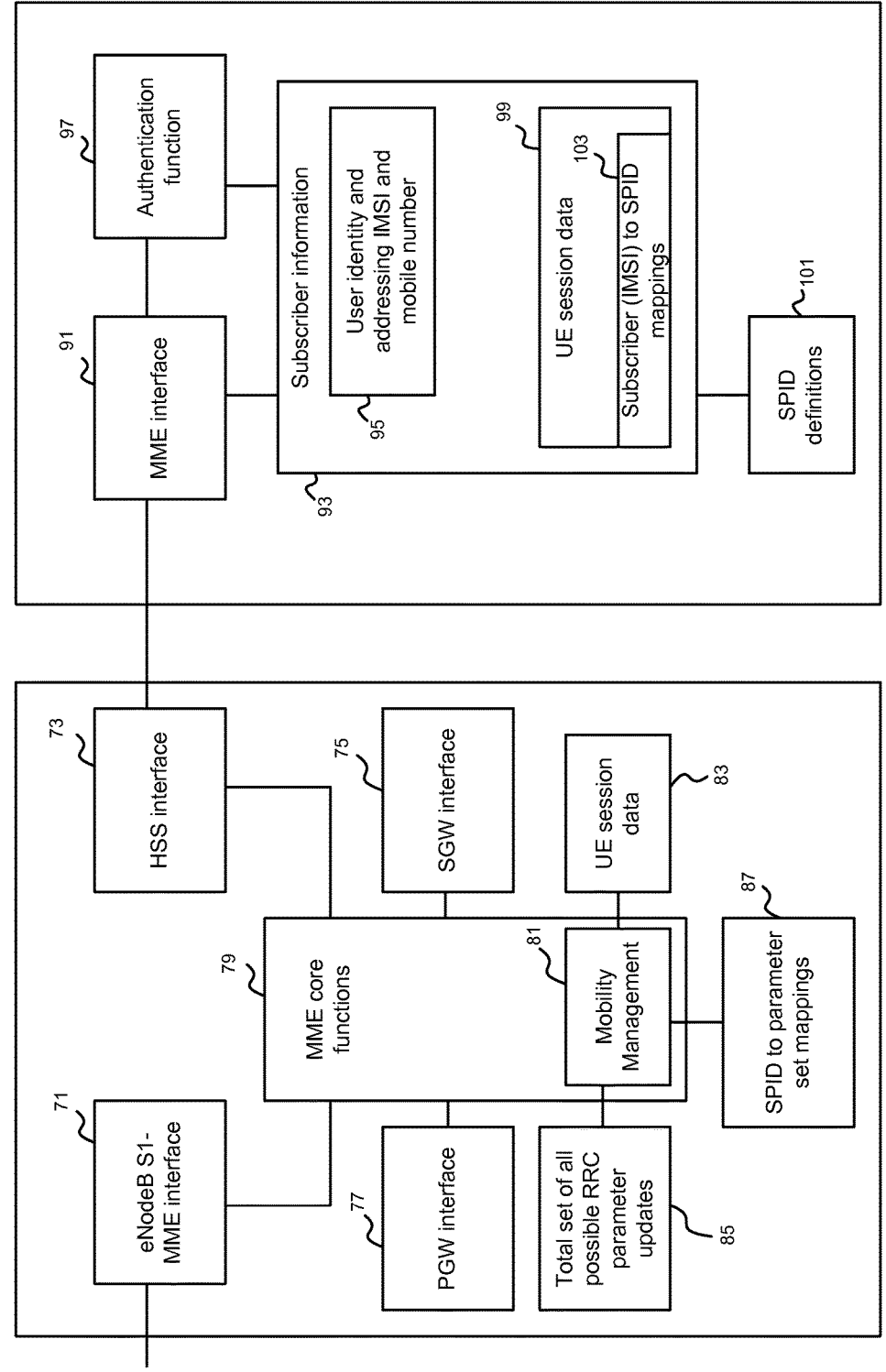
FIG. 8 shows the functional components of an MME and HSS in the first embodiment.

FIG. 8 shows the components of the EPC core 11 of the macrocell network 5 in the first embodiment. For communication with other components in the network 5, Mobility Management Entity (MME) 13 contains a S1 interface 71 to the macrocells 9 in the network 1, a S6 interface 73 to the HSS 15, a S11 interface 75 to the SGW 17 and a S5 interface 77 to the PGW 19.

An MME management function 79 manages the communication between the interfaces 71, 73, 75, 77 for general control plane data exchanges.

As is conventional, the MME management function 79 includes functionality for:
Network Access Control;
Radio Resource Management;
Mobility Management;
Roaming Management;
UE-Reachability;
Tracking Area Management;
Lawful Interception; and
Load Balancing Between SGWs.

To implement the modifications to the idle mode reselection behavior, the mobility management function 81 which has access to the UE session data store 83 is modified to further access a data store storing the complete set of possible RRC parameter updates 85 as defined by a system administrator and a data store storing SPID to parameter set mappings 87. These functions will be described in more detail later once the components of the HSS 15 and the macrocell 9 have been described.

HSS

The HSS 15 is linked to the MME and provides the MME with information relating to the subscribers of the network 5. For communication with the MME, the HSS 15 contains a complementary S1 interface 91 to the MME 13. A subscriber information store 93 is a database that stores information of every user in the network. In FIG. 8, a first store 95 has long term subscriber information relating to user identity and addressing. This includes the IMSI and mobile number of the subscriber. While the values of these entries can change, it is not a very frequent occurrence and changes must be made by an administrator. For example, a subscriber may order a replacement SIM card when upgrading to LTE network access, or port their number from another network.

Fields in the First Store Include:
IMSI—International Mobile Subscriber Identifier
NAM—Network access mode: defines whether the subscriber can access the circuit switched network, packet switched network or both.
Mobile Station International ISDN Number—the subscriber's telephone number linked to the IMSI The HSS 15 also contains a second store 99 within the subscriber information 93 relating to UE session data required to support call control and session management entities of different domains and subsystems. This temporary data may change through normal operation of the system.

An Example of the UE Session Data Store 99:
IMEI—International Mobile Equipment Identity of the UE;
Data relating to authentication and ciphering which is used by the authentication function;
identity of the current MME and/or SGW;
identity of current MSC (not shown) for circuit switched fall back calls;
packet switch properties such as Access Point name the subscriber is allowed to use.

In this embodiment, the subscribers are grouped according to subscriber type, firstly to differentiate macrocell subscribers from small cell subscribers, and furthermore to effect the different types of idle mode reselection behavior as described above. The possible groups are described by Service Profile Identity (SPID) and are set by a system administrator in SPID definitions 101.

Example of SPID Definitions 101:

| SPID | Group |
| --- | --- |
| 10 | all macrocell subscribers |
| 20 | all small cell partner subscribers |
| 25 | small cells subscribers off peak profile |
| 29 | small cell subscribers at 7pm |
| 40 | all roaming subscribers |

In this embodiment, at a coarse level of grouping, SPIDs in the range of 10 to 19 are defined for the macrocell network subscriber UEs 3 and SPIDs in the range of 20 to 29 are defined for the small cell network subscriber UEs 4. Although no roaming subscribers are present in the example, a grouping is also defined for any roaming subscribers.

To associate a SPID to each of the subscribers that can join the macrocell network, the UE session data store 99 contains sets of IMSI to SPID mappings 103.

Example of the IMSI to SPID Mappings 103:

| IMSI | Service Profile Identity |
| --- | --- |
| IMSI#3 | SPID 10 |
| IMSI#4a | SPID 20 |
| IMSI#4b | SPID 25 |
| IMSI#4b | SPID 29 |

With these tables and associations, all possible subscribers of the macrocell network and small cell network are grouped and this information is shared with the MME when it reports a subscriber.

The HSS further includes an Authentication function for verifying the identity of new subscribers connecting to the network 5. This function uses information stored in the UE session data store 95 to generate challenge phrases to the UEs based on public and private key encryption in order for the UE to authenticate itself to the HSS and also for the HSS to authenticate its identity to the UE.

Once a UE has been authenticated onto the network by the HSS, the SPID is sent to the eNodeB as part of the session setup data exchange.

MME

Returning to the MME 13, the Mobility management function 81 is responsible for processing the IMSI to SPID mappings for any connected UEs and determining a respective idle mode reselection behavior. To implement this behavior, the operating information relating to each observed UE is held in UE session data 83 including an identification of the SPID assigned to each UE 3, 4.

The complete set of possible parameter sets used to define the reselection behaviors of the UEs are stored in the RRC parameter update store 85.

The Mobility Management function 81 associates the SPID assigned to a UE 3, 4 and stores the association in SPID to parameter set mappings 87.

Example of the Data Stored in the SPID to Parameter Mappings:

| ID | SPID | parameter set number |
|---|---|---|
| 1 | 10 | parameter set 0 |
| 2 | 20 | parameter set 1 |
| 3 | 25 | parameter set 2 |
| 4 | 28 | parameter set 3 |
| 5 | 29 | parameter set 4 |

With this processing, in addition to having knowledge of the UEs in accordance with the core processing, the MME also has knowledge of the SPID to parameter set mappings so that different UEs can be directed to behave in different ways for idle mode reselection.

The data can then be sent to the macrocells handling the UEs so that they can deliver the new instructions using RRC Connection release messages when the UEs switch from active to idle mode. The new set of handover parameters in the form of updated thresholds and timing information override the parameter values sent in the general SIB messages. The eNodeBs are not sent the complete contents of the data in the MME to save processing. Only information relevant to a macrocell's connected UEs are delivered.

Enode B

Figure 9:
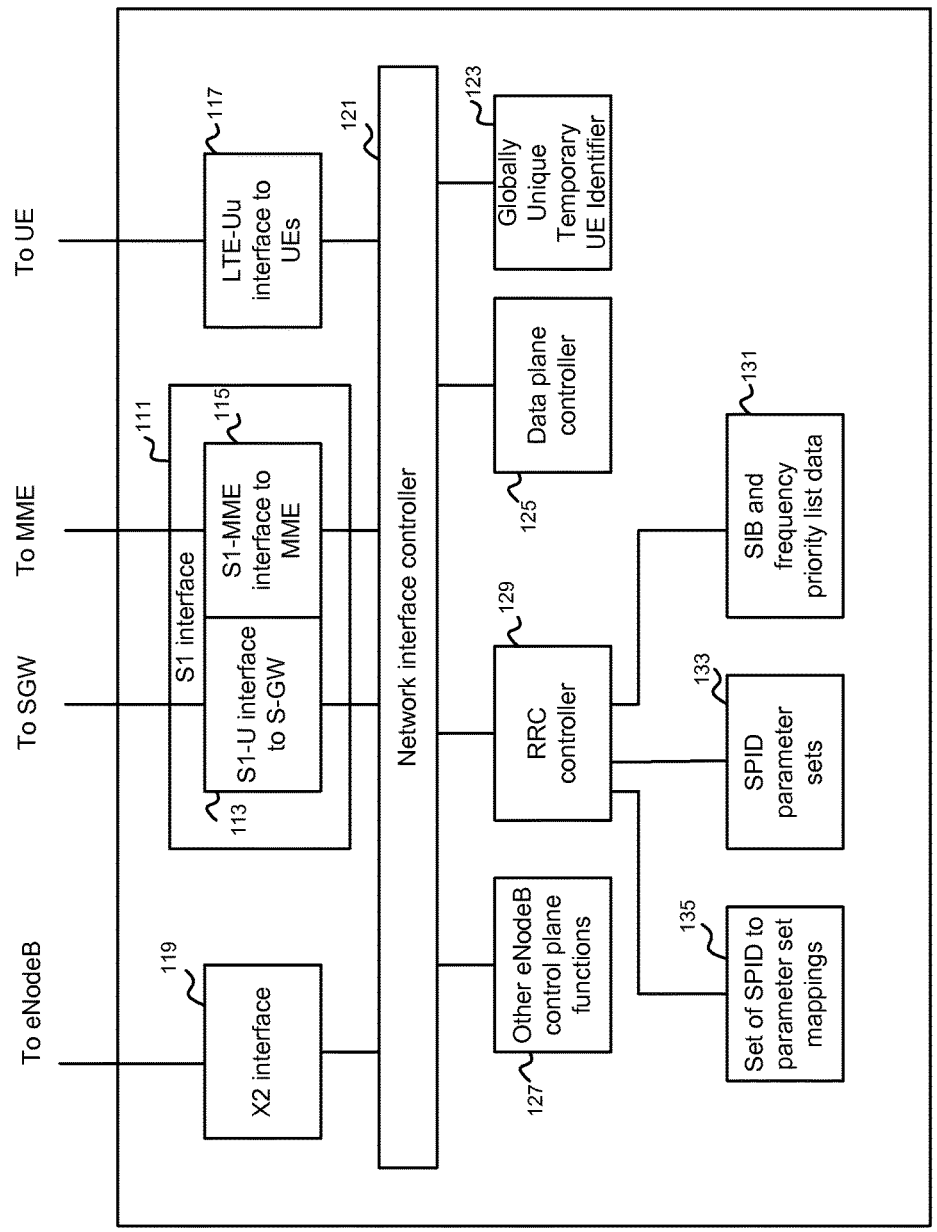
FIG. 9 shows the functional components of an eNodeB in the first embodiment.

FIG. 9 shows the functional components of an eNodeB of the first network in accordance with the first embodiment.

The eNodeB 9 contains a number of network interfaces for communication with the various network entities. Each interface is dedicated with a different class of network component, namely the MME 15, UEs 3, 4 and other macrocells 9.

The S1 interface 111 is for communication with EPC components of the macrocell network 5. The S1 interface can be split into control plane and data plane interfaces. The S1-MME interface 113 is for communication with the MME 15 handling the macrocell 9 for control plane communication and the S1-U interface 115 is for communication with the Serving Gateway (S-GW) 17 for data plane communication.

The LTE-Uu interface 117 is for communication with connected UEs 3, 4 in both active mode and idle mode. The SIB and RRC messages and other control plane data are transferred over this interface 117 to the UEs in addition to data plane data between the UE and external remote applications via the SGW 17.

The X2 interface 119 is for communication with other macrocells 9. This is generally used during handover for UEs 3, 4 which are in active mode.

A network interface controller 121 coordinates the flow of control plane and data plane data between the various S1, X2 and LTE-Uu interfaces 111, 117, 119 and internal functions of the eNodeB such as a Globally Unique Temporary UE Identifier (GUTI) data store 123, data plane controller 125, macrocell control plane functions 127 and a Radio Resource Control (RRC) controller 129.

The GUTI store contains temporary identifiers for all of the UEs connected to the macrocell. Each GUTI is provided by the MME so that the UE can handle functions for each UE without exposing the real identity of the UE. The data plane controller 125 coordinates communication data sessions between the UEs 3, 4 connected via the LTE-Uu interface 117 and SGWs via the S1-U interface 113.

The macrocell control plane functions 127 directs processing of control plane information and coordinates communication between the MME 13, UEs 3, 4 and other eNodeBs 9 via the S1-MME interface 115, LTE-Uu interface 117 and X2 interface 119 respectively.

Functions covered by the control plane functions 127 include radio resource management, authentication and mobile mobility functions which are outside the scope of this disclosure.

The RRC controller 129 is responsible for establishing, managing and tearing down bearer connections to a UE in active mode. It also sends general UE behavior information via SIB broadcasts. When a UE 3, 4 leaves active mode, the RRC controller 129 is configured to send RRC connection release messages to that UE 3, 4 with any further idle mode reselection information in the first embodiment.

The RRC controller 129 is connected to several data stores in order to send the correct information to the UEs. SIB and frequency priority list data store 131 contains the MIB, SIB and frequency priority information broadcast by the macrocell 9 as is conventional.

Since the MME has information regarding the connected UEs and the associated parameter set that should be applied to those UEs when they leave the active mode, the RRC controller is also connected to a SPID parameter data store 133 containing sets of idle mode reselection override parameters for the UEs when they leave the active mode. A mapping data store 135 contains mappings between a SPID and a parameter set.

The MME 13 provides the parameter sets and mappings via the S1-MME interface 115 into the respective store whenever a UE enters into the active mode and connects to the macrocell 9 with an RRC connection request so that resources are allocated by the macrocell control functions 127 and a data session is established between the UE and MME 13 to establish control parameters for the data session. The MME sends the SPID corresponding to the UE to the macrocell so that the macrocell can select the appropriate parameter set to the UE when the UE switches to idle mode.

In the example, only devices 3, 4b and 4c are connected to the macrocell 9a and therefore the SPID mapping store 135 and SPID parameter data store 133 only contain information relevant to those particular UEs.

UE

In LTE, User Equipment is any device used by end users to communicate with external data network resources via an LTE network. Examples of UE include smartphones, LTE enabled tablet devices and computers.

Figure 10:
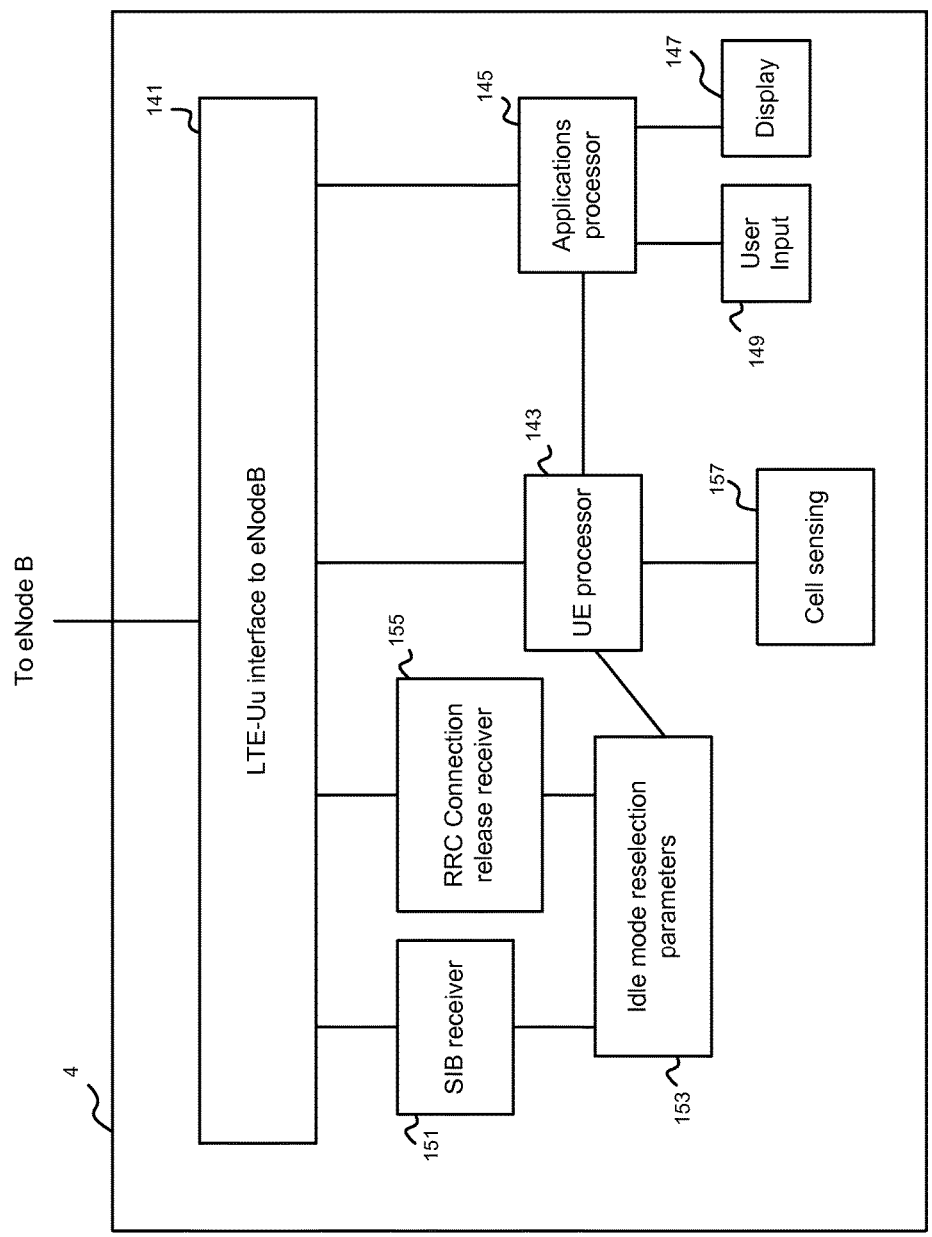
FIG. 10 shows the functional components of a UE in the first embodiment.

FIG. 10 shows the components of a UE 4 in accordance with the first embodiment.

UE 4 contains a LTE-Uu interface 141 for sending a receiving data packets to a small cell or macrocell eNodeB for onward transmission to an MME for control plane data and to a SGW for data plane data.

A UE processor 143 is responsible for the overall control of the UE for mobility management, call control, session management and identity management. It also communicates with other internal functions.

On the data plane, an application processor 145 is connected to a display 147 of the UE and user inputs 149 and when a data session is required, the application processor 145 notifies the UE processor 143 which establishes a data bearer with the eNodeB and MME so that the application processor 145 can contact an SGW and the remote node of the data session.

Applications processed by the application processor 145 include data session between applications such as VoIP or browser, and also include standard voice services currently managed by Circuit Switched Fall back.

In accordance with the processing of the first embodiment, the UE also contains a MIB and SIB information receiver 151, a data store storing idle mode reselection parameters 153, an RRC connection release receiver 155 and a cell sensing function 157 which scans and detects for surrounding eNodeBs.

When in idle mode, the UE will camp with a nearby eNodeB detected by the cell sensing function 157 in accordance with reselection parameters held in idle mode reselection parameters store 153. Typically the values and parameters in the store are received via SIB receiver 151 from an idle mode connected eNodeB which broadcasts the same information to all UEs within its range.

In the first embodiment, the MME is able to differentiate between different types of users and send updated parameters which differ from the SIB message content so that different idle mode reselection behavior can be used by different UEs. The RRC connection release receiver 155 receives any updated parameters and updates the idle mode reselection parameters accordingly. The updates relate not only to thresholds of signal strength, but also to timing information which affects how often or to what proximity from the connected cell the UE starts reselection processing.

In the above example, the macrocell 9 will not send any further parameters to the UEs which are subscribers of the macrocell network since the SIB already defines the required behavior, however, UEs of the small cell network will receive the information in the SIBs but will then receive updated idle mode reselection information when they switch from active mode to idle mode.

The received information of rules and thresholds is stored in the idle mode reselection parameters data store 153 and used in combination with the observed signal characteristics obtained by the cell sensing function to determine whether to remain connected to the current eNodeB or to select one of the available eNodeBs.

Figure 13:
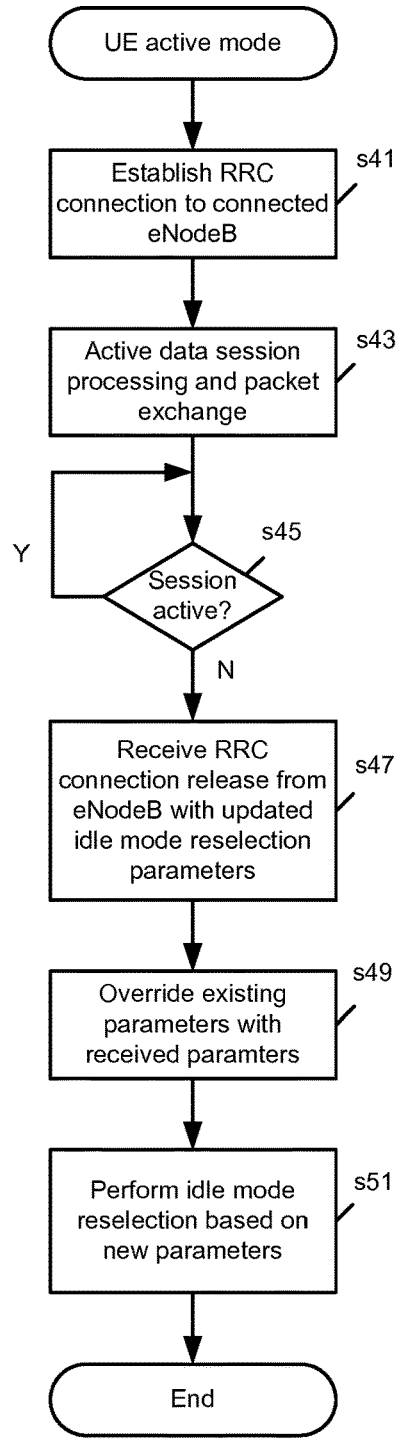
FIG. 13 is a flowchart showing the processing of a UE.

FIGS. 11, 12 and 13 are flowcharts showing the processing flow of the various components relating to idle mode reselection parameters in the first embodiment.

FIG. 11 is a flowchart showing the operation of the MME 13 when a new UE connection is established to the macrocell network.

In s1, the UE IMSI is recovered from the new connection information. In s3, the IMSI is used as a lookup into the HSS to retrieve the subscriber information associated with the UE.

Standard MME functions are performed in s5 such as authentication, establishing UE subscriber state information and determining an SGW for the UE.

In accordance with the first embodiment, the MME is also configured to identify a SPID for the UE in s7 and in s9 the MME retrieves the updated idle mode reselection parameter set for the connected UE. Finally in s11 the SPID and parameter set information is sent to the eNodeB.

After s11 the processing according to the first embodiment is complete although the MME will still be responsible for handling the UE while the UE is in active mode.

FIG. 12 is a flowchart showing the processing of an eNodeB 9 when an idle mode UE camped on with the eNodeB switches to the active mode.

In s21, the eNodeB establishes an RRC connection to the UE. In s23 the UE information and other control data is sent to the MME and in s25 the standard eNodeB functions to transmit data plane packets to an SGW and handle device handover are carried out.

In s27, the eNodeB also receives SPID and parameter set data from the MME.

In s29 the eNodeB checks to see whether the UE is still active, this may be through reception of an explicit message indicating the data session is over, or the eNodeB will notice that packets have not been sent of received for a threshold amount of time and therefore the UE can be assumed to have moved or stopped transmitting.

The check in s29 is continuously performed to until the session is no longer active and in s31 the eNodeB prepares to free up resources by preparing to send an RRC Connection Release message. In s31, the idle mode reselection parameter set is retrieved in accordance with the received SPID and the retrieved set is sent to the UE in a connection release message.

FIG. 13 is a flowchart showing the processing by a UE in accordance with the first embodiment to obtain new idle mode reselection parameters in accordance with the type of subscriber and other factors.

In s41 the UE establishes an RRC connection to an eNodeB which is in range and is deemed to have the strongest signal strength from the UE's location.

In s43 the UE, eNodeB and MME communicate in order to establish the control plane for the data session and the UE contacts an SGW defined by the MME for data plane communication.

In s45 a determination if made to see if the session is still active, if there is still an ongoing data packet exchange then this step is looped until it is deemed to have finished.

As the data exchange is finished, then it is necessary to close the RRC connection and return to idle mode.

In this embodiment, the UE receives an RRC Connection Release message from the eNodeB in s47. This message also contains updated idle mode reselection parameters if there any available for that UE. In the examples above, UEs which are determined to be subscribers of the small cell network will receive parameters which enable them to reselect to small cells more quickly while UEs which are determined to be subscribers of only the macrocell network may not receive any additional parameters, or may receive different parameters only at certain times of day.

In s49, the UE updates its idle mode reselection behavior by using any RRC connection release parameters to override the corresponding stored parameters which were previously received from SIB messages.

Finally in s51, now that the UE is in the idle mode, the UE will perform idle mode reselection based on the new parameters.

In this embodiment, only UEs which have entered and then left active mode will receive updated parameters for future idle mode reselection from an eNodeB. Any UEs which camp with an eNodeB but remain in idle mode the whole time will only receive the standard idle mode reselection parameters as defined in SIB messages.

ALTERNATIVES AND MODIFICATIONS

In one embodiment, there is a macrocell network and a small cell network whereby subscribers of the small cell network can access both the small cell network and the macrocell network. In that scenario, the MME and eNodeBs of the macrocell network are modified to differentiate between the two sets of subscribers and to send updated parameters to the small cell subscriber UEs which override the SIB information so that the small cell network UEs will favor reselection onto the small cell network.

Of course, the processing of the MME and eNodeBs can be configured for many different network configurations and arrangements where differential behavior is desired, for example between two macrocell networks in a national roaming arrangement or between two small cell networks.

The invention claimed is:

1. A method for providing dedicated idle mode reselection parameters to a cellular device in a cellular network, the method comprising a base station of the cellular network performing the following:
   determining a subscriber group for the cellular device;
   identifying a set of operating parameters associated with the cellular device in accordance with the determined subscriber group, wherein the operating parameters alter the idle mode reselection behavior of the cellular device; and
   sending the set of operating parameters so as to override any existing parameter values stored at the cellular device,
   wherein the cellular device performs idle mode reselection in accordance with the overriding operating parameters.

2. A method according to claim 1, wherein different sets of operating parameters can be mapped to the cellular device at different times.

3. A method according to claim 1, wherein the operating parameters alter the timing and frequency that the cellular device will perform idle mode reselection.

4. A method according to claim 1 wherein the cellular device can access two different cellular networks and the operating parameters bias the cellular device to reselect to one of the two different cellular networks.

5. Apparatus for providing dedicated idle mode reselection parameters to a cellular device in a cellular network, the apparatus comprising:
   a base station comprising a processor and a memory and configured to:
      determine a subscriber group for the cellular device;
      identify a set of operating parameters associated with the cellular device in accordance with the determined subscriber group, wherein the operating parameters alter the idle mode reselection behavior of the cellular device; and
      send the set of operating parameters to the cellular device so as to override any existing parameter values stored at the cellular device,
   wherein the cellular device performs idle mode reselection in accordance with the overriding operating parameters.

6. Apparatus according to claim 5, wherein different sets of operating parameters can be mapped to the cellular device at different times.

7. Apparatus according to claim 5, wherein the operating parameters alter the timing and frequency that the cellular device will perform idle mode reselection.

8. Apparatus according to claim 5, wherein the cellular device can access two different cellular networks and the operating parameters bias the cellular device to reselect to one of the two different cellular networks.

* * * * *